UNITED STATES PATENT OFFICE.

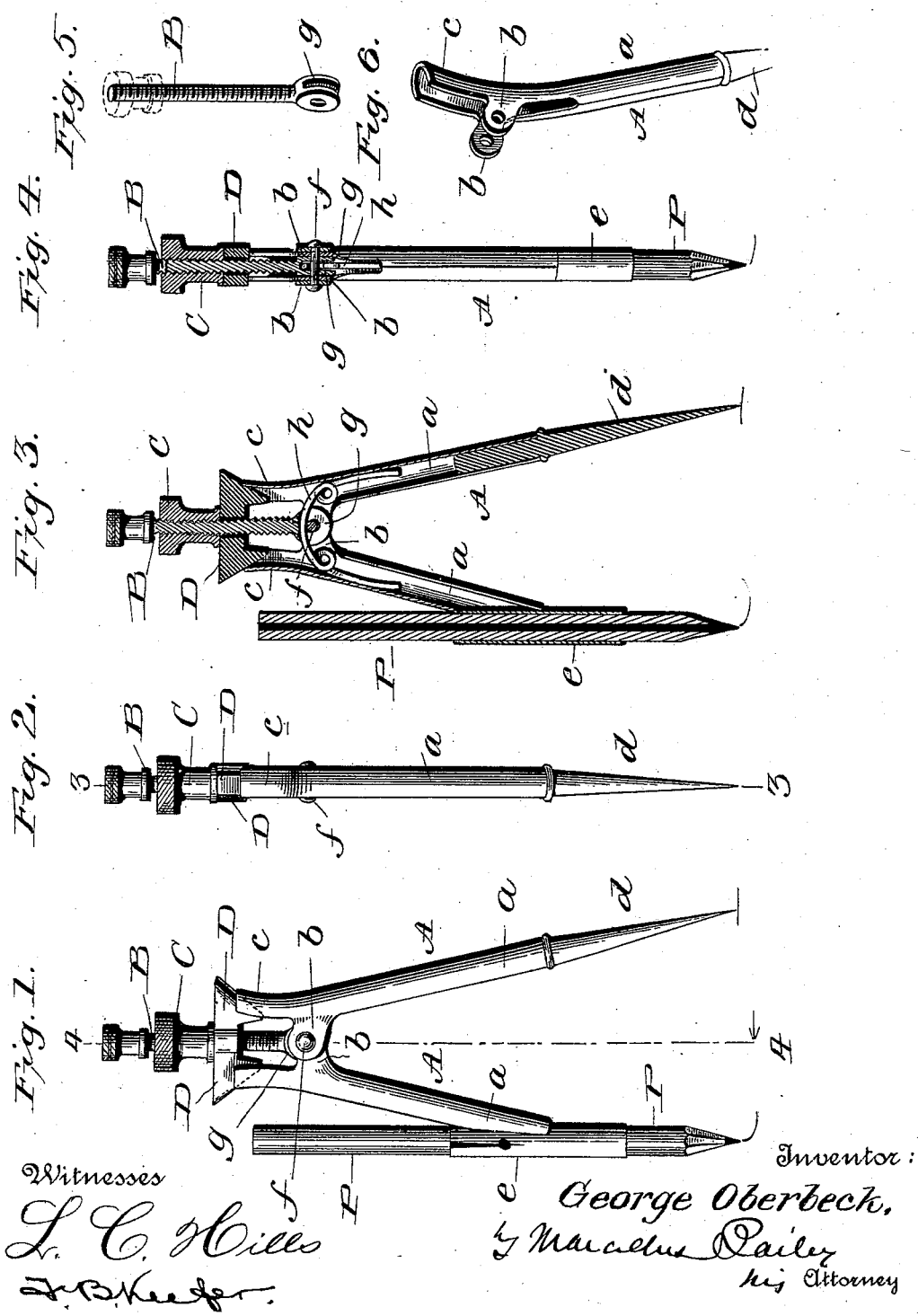

GEORGE OBERBECK, OF JERSEY CITY, NEW JERSEY, ASSIGNOR TO THE EAGLE PENCIL COMPANY, OF SAME PLACE, AND NEW YORK, N. Y.

CALIPERS.

SPECIFICATION forming part of Letters Patent No. 530,713, dated December 11, 1894.

Application filed August 22, 1894. Serial No. 520,955. (No model.)

*To all whom it may concern:*

Be it known that I, GEORGE OBERBECK, of Jersey City, in the county of Hudson and State of New Jersey, have invented a new and useful Improvement in Calipers, of which the following is a specification.

My invention has reference to spring calipers or dividers, in which the legs are spread apart by a spring, and are closed by means of a nut mounted on a vertical screw stem back of the pivot on which the legs move, and operating, usually through the intermediary of a sliding block, upon extensions of the legs between which the block fits, the meeting faces of the block and leg extensions being so formed as to cause the block, when pressed upon and forced down between them, to close the legs together. Calipers or dividers of this type are old.

My invention consists in a novel construction and arrangement of the parts whereby a very efficient device of the kind is produced, of simple, compact and inexpensive construction.

The nature of my invention can best be explained and understood by reference to the accompanying drawings, in which—

Figure 1 is a front elevation of a device embodying my invention. Fig. 2 is a side or edge elevation of the same. Fig. 3 is a section on line 3—3 Fig. 2. Fig. 4 is a section on line 4—4 Fig. 1. Fig. 5 is a view of the screw stem detached; and Fig. 6 is a view of one of the legs detached.

The legs A for the main part are of sheet metal and are formed each from a sheet metal blank which is bent and swaged into the shape shown in the drawings—more particularly in Fig. 6—so as to have the tubular portion $a$, the ears $b$ and the trough-like or concavo-convex flaring extension $c$ above the ears $b$. One of the legs is represented as provided with a metal point $d$ which fits and is held in the lower end of the leg. The other is provided with a split and spring-clasping sheet metal pencil-holder $e$ of any known construction, which is set at an angle to the leg so as to permit the convenient insertion of the pencil P and to allow the head of that pencil to pass through and extend up above or in the rear of the holder without interfering with or abutting against the head of the calipers. This arrangement is convenient, but in lieu of it, the ends or points of the legs may be of any approved construction. The legs are held together by a pivot pin $f$ which passes through their ears—the latter being perforated and being put together so that the holes in them will register and thus permit the passage of the pin, which then is secured in place by riveting down its ends, or in any other suitable way. Before the pin is inserted the perforated end of a screw B is inserted between the ears, with its holes in register with those in the ears, so that the same pin will hold all the parts together. This end of the screw is slotted as shown at $g$ and through this slot $g$, above the pivot $f$, passes the bight of a bent spring $h$, the outer and free ends of which pass down into and are housed in the tubular legs A, and bear outwardly against the same. The spring is inserted in place in the legs, when the ears of the latter are brought together, but before the screw B is placed between the ears or the pivot pin is inserted. After the spring is thus put in place, the screw is fitted between the ears, its slotted end straddling the bight of the spring; and then when the holes in the ears and the end of the screw are brought in register, all parts are secured in place by the pivot-pin. The spring at its center or bight is held in the space between the pivot and the bottom of the slot $g$ in the screw. Its ends are completely housed by the legs into which they extend.

Upon the screw-stem is mounted a nut C which engages the thread on the screw and is the means by which the legs A are closed against the stress of their spring $h$. The spreading action is attained by means of a block D loosely encircling, and capable of free movement back and forth on the screw stem. The block is formed with wings or lateral projections which bear upon the upper ends of the legs for the purpose of closing the latter; and they also engage these ends of the legs, so as to guide the block and prevent its displacement or rotation. To this end the wings in the present instance fit in the concave extensions $c$, and the meeting faces of the block and the extensions are so formed, as shown, that, when, by the nut C, the block is forced down between the extensions, the latter will be spread apart, with the effect, of course, of closing the legs A together.

In this simple way, I am enabled to furnish a sure guide for the block D in its movements; without the use of auxiliary devices, such as a spline and groove connection with the stem B.

Having thus described my invention, what I claim as new, and desire to secure by Letters Patent, is as follows:

1. The tubular sheet metal legs formed with ears $b$ and extensions above the pivotal point, in combination with the screw stem B, the pivot pin by which the ears $b$ and the screw stem are held together, the nut C, the sliding block D loosely encircling the screw stem and provided with wings or lateral projections bearing against and engaging said extensions, and the spring, as herein shown and described.

2. The sheet-metal legs formed with tubular parts $a$, ears $b$, and extensions $c$, in combination with the screw stem having slotted end $g$, the nut C and block D, provided with side wings which bear upon and engage said extensions, the pivot-pin by which the legs and screw-stem are held together, and the spring $h$, passing through the slotted end of the screw-stem above the pivot-pin, and having its free ends downwardly extending and housed in the legs, as herein shown and described.

3. In combination with the tubular legs, the screw stem having slotted end $g$, and the pivot pin by which said stem and legs are secured together, of the spring $h$ having its bight contained in the slotted end of the screw-stem above the pivot pin, and its free downwardly extending ends housed in the tubular legs, as herein shown and described.

In testimony whereof I have hereunto set my hand in the presence of two witnesses.

GEO. OBERBECK.

Witnesses:
SAMUEL KRAUS,
PERCY H. BUCKMASTER.